United States Patent
Sykes

(10) Patent No.: US 6,282,980 B1
(45) Date of Patent: Sep. 4, 2001

(54) SELF-ADJUSTING PARKING BRAKE ACTUATOR

(75) Inventor: Michael Sykes, Orangeville (CA)

(73) Assignee: Ventra Group Inc., Bradford (CA)

( * ) Notice: Subject to any disclaimer, the term of this patent is extended or adjusted under 35 U.S.C. 154(b) by 0 days.

(21) Appl. No.: 09/401,973

(22) Filed: Sep. 23, 1999

(51) Int. Cl.[7] ............................... G05G 5/06; G05G 1/10
(52) U.S. Cl. ................... 74/528; 74/523; 74/567; 74/575; 74/577 M; 74/578; 74/529; 74/535; 74/536; 74/540; 74/545; 74/501.6; 74/516
(58) Field of Search .................... 74/512, 513, 560, 74/518, 538, 535, 527, 528, 523; 192/111 A, 536

(56) References Cited

U.S. PATENT DOCUMENTS

| | | |
|---|---|---|
| 2,026,350 | 12/1935 | Looschen . |
| 2,940,334 | 6/1960 | Koskela . |
| 3,003,365 | 10/1961 | McKenzie . |
| 3,236,120 | 2/1966 | Fender . |
| 3,236,121 | 2/1966 | Gdowik et al. . |
| 3,578,759 * | 5/1971 | Yamazaki et al. ............ 74/540 |
| 3,875,820 | 4/1975 | Morden . |
| 3,918,321 * | 11/1975 | Hygarger ............... 74/516 |
| 3,974,713 | 8/1976 | Toohey . |
| 4,149,433 | 4/1979 | Schröter . |
| 4,391,159 | 7/1983 | Sellmeyer . |
| 4,440,269 | 4/1984 | Harriott . |
| 4,515,036 | 5/1985 | Dotson . |
| 4,570,508 | 2/1986 | Nicholson et al. . |
| 4,612,823 | 9/1986 | De Leeuw et al. . |
| 4,819,501 | 4/1989 | Kraus et al. . |
| 4,841,798 | 6/1989 | Porter et al. . |
| 4,850,242 | 7/1989 | Hass et al. . |
| 5,001,942 | 3/1991 | Boyer . |
| 5,211,072 | 5/1993 | Barlas et al. . |
| 5,217,094 | 6/1993 | Walter et al. . |
| 5,272,935 | 12/1993 | Heinemann et al. . |
| 5,280,734 | 1/1994 | Riffle et al. . |
| 5,309,786 | 5/1994 | Paré et al. . |
| 5,448,928 | 9/1995 | Harger . |
| 5,467,666 | 11/1995 | Soucie et al. . |
| 5,477,746 | 12/1995 | Perisho et al. . |
| 5,533,420 | 7/1996 | Perisho . |
| 5,546,828 | 8/1996 | Golarz . |
| 5,611,249 | 3/1997 | Perisho et al. . |
| 5,649,453 | 7/1997 | Kanbe . |
| 5,758,547 | 6/1998 | Smale . |
| 5,787,761 | 8/1998 | Wang . |
| 5,819,595 | 10/1998 | Cebollero . |
| 5,832,784 | 11/1998 | McCallips et al. . |
| 5,875,689 | 3/1999 | Huebner . |

FOREIGN PATENT DOCUMENTS

| | | |
|---|---|---|
| 56-119762 * | 2/1980 | (JP) ........................ 74/512 |
| 3-284455 | 12/1991 | (JP) . |
| 5-131905 | 5/1993 | (JP) . |

* cited by examiner

Primary Examiner—Vinh T. Luong
(74) Attorney, Agent, or Firm—Bereskin & Parr

(57) ABSTRACT

A self-adjusting parking brake actuator for a vehicle is provided having an eccentrically-mounted self-adjust cam assembly. The cam assembly is mounted eccentrically to the lever axis to provide a variable mechanical advantage during actuator stroke. The eccentric offset for the self-adjusting cam is less than the outside radius of the cam to reduce the overall space requirements of the actuator.

20 Claims, 8 Drawing Sheets

SELF-ADJUSTING PARKING BRAKE ACTUATOR

FIELD OF THE INVENTION

The present invention relates to vehicle parking brakes and, in particular, to a self-adjusting actuator mechanism for automatically taking up cable slack introduced in the parking brake cable over time and/or during installation.

Vehicle parking or emergency brakes are typically actuated by a pivoting foot-operated or hand-operated actuator lever positioned adjacent the driver. The parking brake actuator is typically fixed to the vehicle by means of a mounting bracket, or the like, and attached to a brake cable connected to a vehicle parking brake system. The actuator lever is typically pivotably mounted on the bracket and adjustable between a 'brake-released' position and one or more 'brake-applied' positions. The brake cable is attached to the actuator lever so that rotation of the lever in the 'brake-apply' direction increases tension in the brake cable, thereby applying the parking brakes to the vehicle wheels to impede rotation thereof. A position lock is provided to releasably lock the lever in a 'brake-applied' position and a release mechanism is provided to selectively permit rotation of the lever back to the 'brake-released' position.

A problem well-known in the art is induced cable stretch, occurring as the parking brake system is repeatedly cycled, which detrimentally affects the performance of the brake by reducing the maximum available braking force. Cable slack is also unavoidably introduced during the initial installation of the parking brake system and must be accommodated.

One approach for automatically reducing slack in the brake cable involves providing a socalled self-adjusting actuator which typically adds an intermediate element to an otherwise standard parking brake actuator assembly. Such actuators are disclosed in U.S. Pat. Nos. 4,841,798 to Porter et al., 4,850,242 to Hass et al., and Japanese Patent Application No. 56-119762 to Kokai. Typically, this intermediate element, known variously in the art as a self-adjusting cam, cable drum, or cable pulley, is rotatably connected to the mounting bracket independent of the actuator lever. The brake cable head is attached to the rotatable cam, rather than to the lever directly, and the cam is selectively lockable to the lever, for rotation therewith when locked, by a suitable clutch means. When the actuator lever is positioned in the 'brake-released' position, the cam is permitted to rotate independently of the lever, and suitable spring means are provided to bias the cam in the brake-apply direction relative the lever, thereby causing the cam to rotate to automatically remove any slack present in the brake cable. A minimum residual tension in the cable is thus maintained when the parking brake is not activated. When the lever is rotated out of the 'brake-released' position, the clutch automatically locks the cam to the lever, thereby permitting lever rotation to tension the cable and apply the vehicle parking brakes.

In many prior art self-adjusting parking brake actuators, the actuator lever and the cam are concentrically mounted, as shown in Porter et al., Hass et al. and Kokai, It is well-known that concentric designs yield a constant mechanical advantage vis-à-vis lever load and induced cable tension. Such parking brake actuators offer a fixed amount of cable travel per a given unit of lever travel, and, thus, a constant mechanical advantage to the operator. Generally speaking, however, brake system cable travel versus cable load is not a constant relationship. Larger amounts of cable take up under relatively light loads, are required at the initiation of the brake application stroke, and smaller amounts of cable travel are required under substantially higher cable loads as the end of the brake application stroke is reached. Due to their constant mechanical advantage, concentric actuators can require relatively long levers to balance mechanical advantage and cable take up requirements of the vehicle application, especially if the surrounding environment limits the range of lever motion available. Practically, this typically requires that the actuator mechanism have a very high mechanical advantage to ensure that the maximum input force required from an operator is not too large. This disadvantageously increases the overall size of the actuator, however, Providing a device which varies the mechanical advantage as the lever is rotated in the 'brake-apply' direction would advantageously permit the ratio of cable movement to lever movement to be decreased as the lever is rotated in the 'brake-apply' direction, thereby reducing the overall force required of the operator in applying the parking brakes to the vehicle. Such devices are known and typically involve an eccentric positioning of the lever pivot and cam pivot axes, as shown in U.S. Pat. Nos. 5,211,072 to Barlas et al., U.S. Pat. No. 5,477,746 to Perisho et al. and U.S. Pat. No. 5,546,828 to Golarz. In such devices, at the onset of parking brake application, the input force required to take up the initially low tensioned cable is small (i.e. low mechanical advantage), but the input force requirements (and the mechanical advantage) rapidly increase as the parking brake is further applied and the brake cable is further tensioned.

Known eccentric self-adjusting parking brakes, however, have the disadvantage of having mechanisms which require additional components and/or complexly-shaped components to achieve the desired cable takeup, as shown in the devices of in Golarz et al., Barlas et al. and Perisho et al. The production costs of such devices, however, is correspondingly increased. Further, such devices require additional space to achieve the motions required by their respective stroke envelopes. Clearly, space is an ever-precious commodity as automobiles become smaller in the face of demands for increased fuel efficiency, and the like. Thus, many current vehicle applications have environmental space requirements which do not permit known eccentric designs to be utilized.

Thus, there is a need for a high performance, cost-effective, and reliable self-adjusting parking brake actuator that does not suffer from the disadvantages described above.

SUMMARY OF THE INVENTION

The device of the present invention offers an eccentrically-mounted self-adjusting parking brake actuator which is compact in comparison to known eccentric designs and offers greatly improved performance over known concentric designs. The present invention thereby offers increased performance for a given actuator size, in terms of environmental space required by the actuator in operation, over both the eccentric and concentric designs of the prior art.

In one aspect, the present invention provides a lever mechanism for applying tension to a cable comprising a bracket, a lever assembly, the lever assembly rotatably mounted to the bracket about a lever axis for rotation between a first position and a second position, a position lock for releasably locking the lever assembly in the second position, a cam member for connection to the cable, the cam member having a radius, the cam member rotatably mounted on the lever assembly for rotation about a cam axis, the cam axis offset from the lever axis by a distance less than the cam member radius, a spring for rotatably biasing the cam member in a direction tending to increase tension in the cable, the spring extending between the cam member and the lever assembly, and a clutch assembly mounted on the lever assembly, the clutch assembly actuatable to selectively prevent rotation of the cam member relative to the lever assembly, the clutch assembly actuatable upon rotation of the lever assembly.

In a second aspect, the present invention provides a mechanism for variably tensioning a vehicle parking brake cable comprising a bracket, a lever rotatably mounted to the bracket, the lever rotatable about a lever axis, the lever rotatable between a brake-release position and a brake-apply position, the lever axis defining an axial direction, a position lock for releasably locking the lever in the brake-apply position, a cam member for connection to the brake cable, the cam member rotatable about a cam axis, the cam axis offset from the lever axis, the cam member mounted to the lever, the cam member positioned adjacent the lever in the axial direction, a spring for rotatably biasing the cam member in a brake-apply direction, and a clutch mounted on the mechanism, the clutch selectively locking the cam member relative to the lever assembly upon rotation of the lever assembly out of the brake-release position.

In a third aspect, the present invention provides a vehicle parking brake actuator for variably tensioning a brake cable comprising a bracket, a lever rotatably mounted to the bracket, the lever rotatable about a lever axis, the lever rotatable between a brake-release position and a brake-apply position, the lever axis defining an axial direction, locking means for releasably maintaining the lever in the brake-apply position, self-adjusting means for connection to the brake cable, the self-adjusting means rotatable about a cam axis, the cam axis offset from the lever axis, mounting means for mounting the self-adjusting means to the lever, positioning means for positioning the self-adjusting means adjacent the lever in the axial direction, biasing means for rotatably biasing the self-adjusting means relative to the lever in a brake-apply direction, and clutch means for selectively preventing rotation of the self-adjusting means relative to the lever.

The objects and advantages of the present invention will be better understood and more readily apparent with reference to the remainder of the description in conjunction with the accompanying drawings.

BRIEF DESCRIPTION OF THE DRAWINGS

For a better understanding of the present invention and to show more clearly how it may be carried into effect, reference will be made by way of example to the accompanying drawings, in which.

DETAILED DESCRIPTION OF THE PREFERRED EMBODIMENT

A self-adjusting parking brake actuator in accordance with a preferred embodiment of the present invention is shown generally in the Figures at 10. The actuator 10 is shown and described herein in a hand-operated embodiment, however one skilled in the art will appreciate that the present invention is easily adaptable to a foot-operated configuration (not shown) and, thus, such adaptation need not be discussed further in this description.

Figure 1:
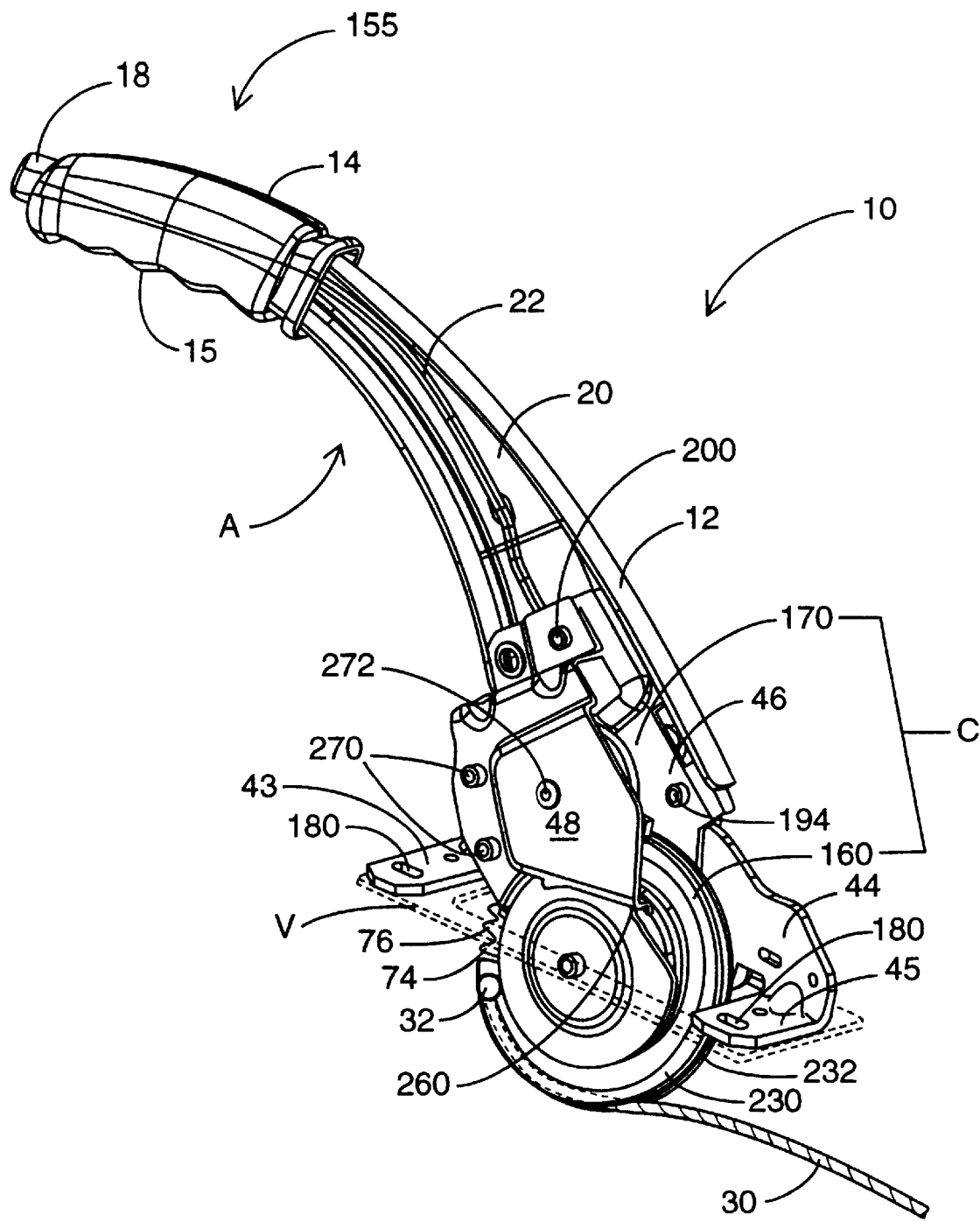
FIG. 1 is an isometric view, from the rear and to one side, of a parking brake actuator according to the present invention.
Figure 2:
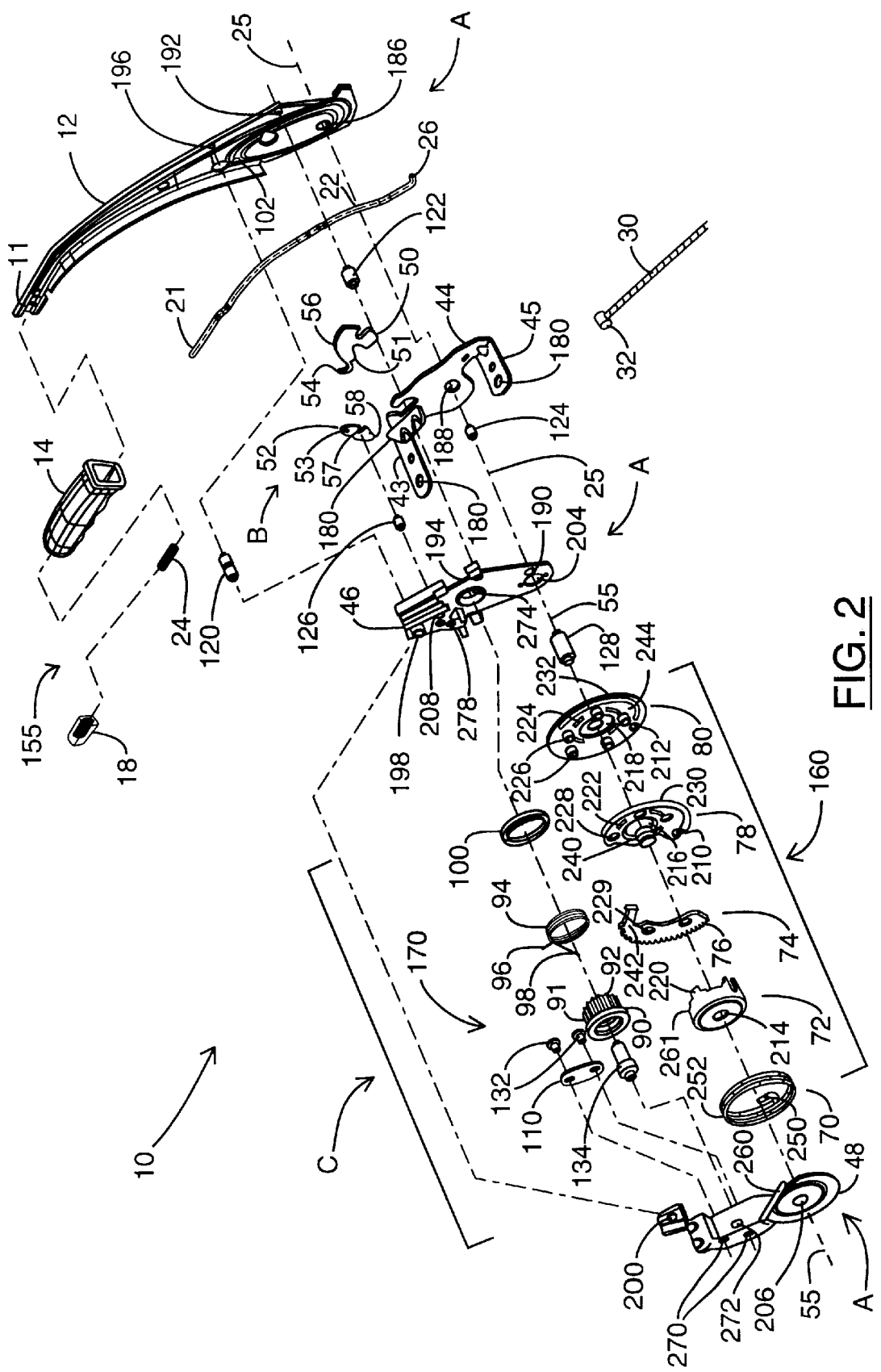
FIG. 2 is an exploded isometric view of the actuator of FIG. 1.

Referring to FIGS. 1 and 2, actuator 10 comprises a lever assembly A, a position locking assembly B, and a tension self-adjust assembly C, having a self-adjusting cam subassembly 160 and a clutch subassembly 170. A brake cable 30 is connectable to self-adjust assembly C, as will be described below.

Lever assembly A comprises a lever handle 12, an intermediate plate 46 and a cover plate 48 connected by a rivet 120 positioned through holes 196, 198, and 200, respectively. Lever 12 and intermediate plate 46 are also joined by a rivet 122, via holes 192 and 194, and by a pivot rivet 124, through holes 186 and 190. Intermediate plate 46 and cover plate 48 are also joined by a cam rivet 128, through holes 204 and 206, and a pinion rivet 134, through holes 272 and 274. Pivot rivet 124, cam rivet 128 and pinion rivet 134 also have other functions which are described in more detail below.

Lever 12 has a free end 11 having a hand grip 14 to facilitate the grasping of lever 12 by the vehicle operator. An undulating surface 15 on grip 14 is provided for the operator's comfort and increased control. Lever assembly A is rotatably mounted on a mounting bracket 44, for rotation about a fulcrum or lever axis 25 defined by pivot rivet 124 positioned through holes 186, 188, and 190 in lever 12, mounting bracket 44, and intermediate plate 46, respectively.

Mounting bracket 44 has lugs 43 and 45 for connection in any suitable manner to a vehicle body V, via holes 180. Brake cable 30 may be of any type and construction known in the art.

Position lock assembly B comprises a pawl subassembly 150 and a pawl release subassembly 155. Pawl subassembly 150 comprises a ratchet sector 50, having a shoulder 51 and teeth 56, and a pawl 52, having a nose 58 for engagement with teeth 56, as will be described below. Ratchet 50 also comprises a finger 54 (see also FIG. 4) for actuating clutch subassembly 170, as will be described further below. Ratchet 50 is fixedly mounted on mounting bracket 44. Pawl 52 is pivotably mounted between lever handle 12 and intermediate plate 46 by a pawl rivet 126 positioned through holes 57, 102 and 208. Pawl 52 is positioned on lever assembly A such that, as lever assembly A is rotated about lever axis 25, nose 58 of pawl 52 is continuously capable of operative engagement with teeth 56 on ratchet 50, as will be understood by one skilled in the art.

Release subassembly 155 comprises a push button 18 operatively connected to a rod 22 having ends 21 and 26. Rod 22 is substantially rigid and positioned longitudinally in an interior space 20 of lever 12. Rod end 21 is positioned adjacent lever free end 11 and cooperates with a push button 18 and a release spring 24 (see FIGS. 4 and 5). Push button member 18 is slidably and depressibly located in grip 14, with release spring 24 outwardly biasing push button 18. Rod end 26 is connected to pawl 52 at a guide slot 53, on an opposite side of a pawl pivot 57 from nose 58. Spring 24 also biases rod 22 away from pawl subassembly 150 (ie. spring 24 simultaneously pushes button 18 away from lever end 11 and pulls rod 22 towards lever end 11), and thereby biases guide slot 53 away from ratchet 50, causing nose 58 to be pivotably biased towards ratchet 50 to selectively maintain biased contact therewith.

Self-adjust assembly C, which comprises self-adjusting cam subassembly 160 and clutch subassembly 170, is mounted to lever assembly A between intermediate plate 46 and cover plate 48, as will be described further below.

Figure 6:
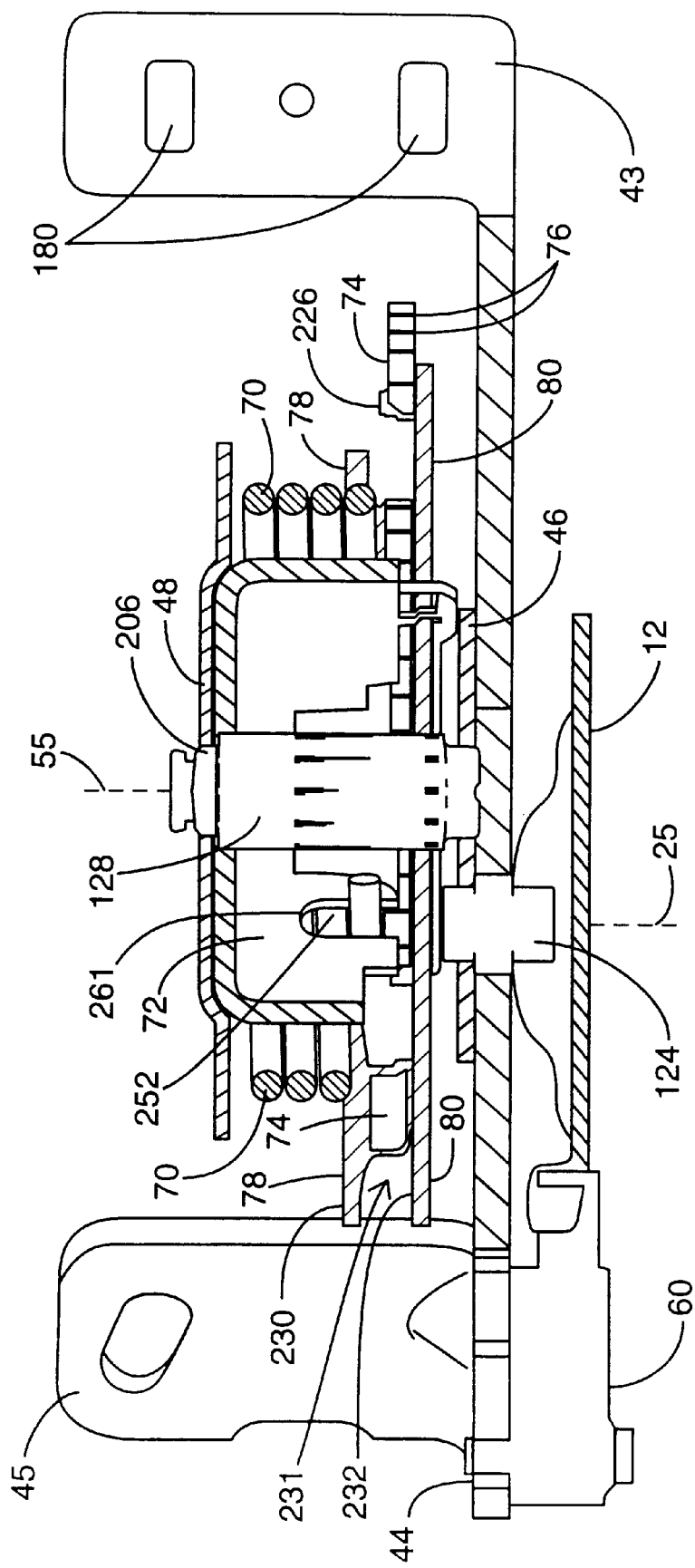
FIG. 6 is a cross-sectional view of the actuator of FIG. 1, taken along the line 6—6 in FIG. 3.

Referring to FIGS. 2 and 6, self-adjusting cam subassembly 160 comprises a drum 72, an inner cam 78, an outer cam 80, a cam sector 74, having a plurality of engagement teeth 76, and a helical self-adjust spring 70. Cam sector 76, outer cam 78 and inner cam 80 a secured to one another by bosses 226 upset in holes 228 and 229. Drum 72, inner cam 78 and outer cam 80 are secured together through the cooperation of tabs 220 and slots 222 and 224. Cam subassembly 160 is rotatably mounted to lever assembly A between cover plate 48 and intermediate plate 46 by cam rivet 128, mounted in holes 204 and 206, respectively, and passing through holes, 214, 216, and 218, respectively. Intermediate plate 46 thus positions cam subassembly 160 axially adjacent of lever 12. Cam rivet 128 provides a cam axis 55 for the rotation of cam subassembly 160 therearound, as described further below.

Figure 8:
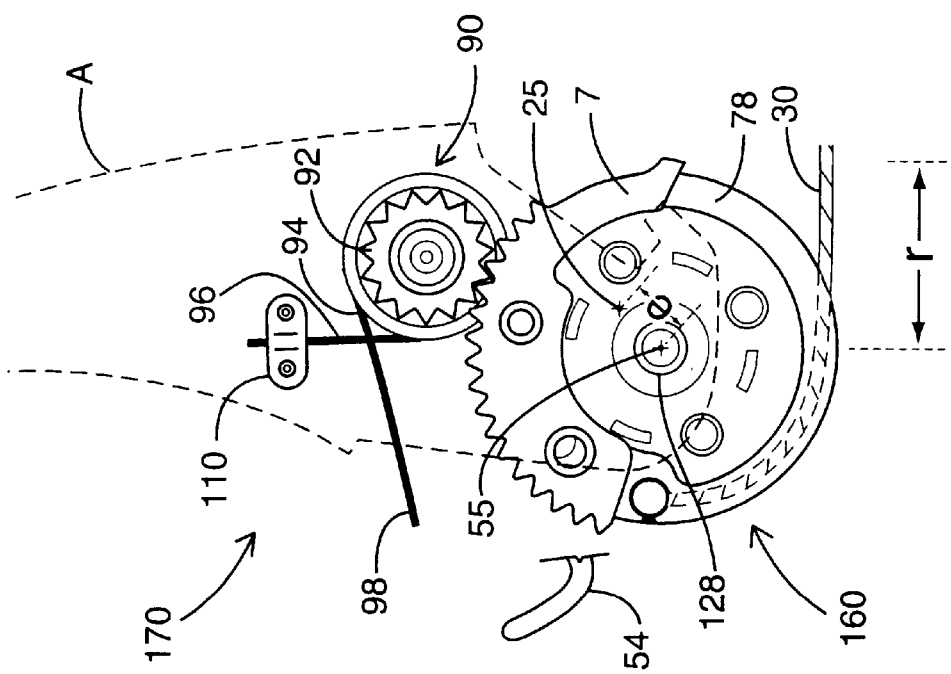
FIG. 8 is a side view of the self-adjust assembly of the present invention, shown in a 'brake-applied' position.
Figure 7:
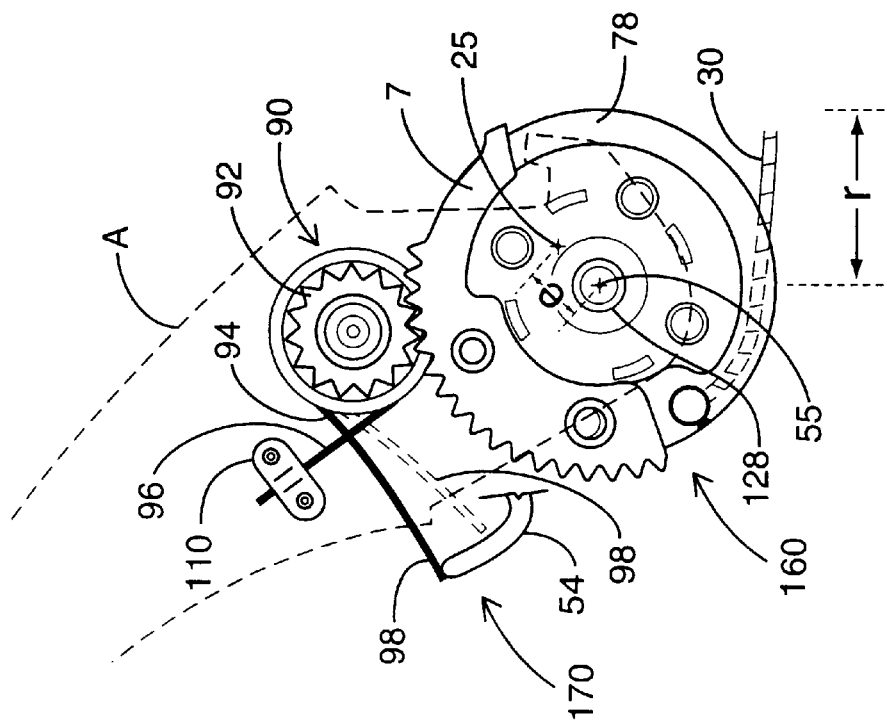
FIG. 7 is a side view of the self-adjust assembly of the present invention, shown in the 'brake-released' position.

Referring briefly to FIGS. 6, 7 and 8, cam axis 55 is parallel to, and offset from, lever axis 25. The offset amount, indicated by reference letter "e" in the Figures, is less than the outer radius "r" of cam subassembly 160, as will be described in more detail below.

Referring again to FIGS. 2 and 6, spring 70, having an outer tang 250 and an inner tang 252, is positioned between cam subassembly 160 and lever assembly A and preferably between cam subassembly 160 and cover plate 48. Self-adjust spring 70 is mounted around drum 72, with outer tang 250 fixed to cover plate 48, by engagement of slot 260 therewith, and inner tang 252 inserted into a retention slot 261 in drum 72. The self-adjust spring 70 is installed in a pre-stressed state so as to bias the self-adjusting cam subassembly 160 in the 'brake-apply' direction, for reasons described in more detail below. It will be understood by one skilled in the art that, since spring 70 is provided prior to installation in a prestressed state, suitable caging means for cam subassembly 160 should be provided. Examples of manual and automatic caging means are discussed and disclosed in U.S. Pat. No. 5,235,867 to Wortmann et al., incorporated herein by reference.

Cam subassembly 160 has slots 210 and 212 for receiving a cable head 32, positioned on the actuator end of brake cable 30, for connecting brake cable 30 to cam subassembly 160. Outer cam 78 and inner cam 80 have flanges 230 and 232, respectively, which cooperate to form a cable guide 231 for ensuring an orderly peripheral positioning of cable 30 around cam subassembly 160, as cam subassembly 160 is rotated in the 'brake-apply' direction (as seen in FIGS. 7 and 8 and described further below).

Referring again to FIG. 2, clutch subassembly 170 comprises a pinion 90, having a hub 91 and teeth 92, and a helical clutch spring 94 wrapped around hub 91. Pinion 90 is rotatably mounted to lever assembly A, preferably between cover plate 48 and intermediate plate 46 by pinion rivet 134 extending between holes 272 and 274, restively. Spring 94 is positioned on hub 91 such that an interference fit occurs therebetween, permitting the windings of spring 94 to securely grip hub 91. A pinion spacer ring 100 is preferably provided to impede interference between clutch spring 94 and teeth 92. Teeth 92 operatively engage teeth 76 of cam sector gear 74. Clutch spring 94 has tangs 96 and 98.

Referring to FIGS. 7 and 8, tang 96 is fixed to cover plate 48 by an anchor clip 110 held by a pair of anchor rivets 132 in holes 270. Tang 98, however, remains free for selectively tabbing thereof by finger 54, as will be described in more detail below.

As will be understood by one skilled in the art, spring 94 is oriented on hub 91 of pinion 90 such that rotation of pinion 90 in a clockwise direction (with reference to FIGS. 5, 7, 8) tends to wind spring 94 more tightly around hub 91, through the frictional contact of hub 91 and spring 94. Further, it will be understood by one skilled in the art that, while spring 94 may be fabricated from stock having a rounded cross-section, a rectangular cross-section spring is desired to increase the contact surface area between spring 94 and hub 91, thereby increasing the gripping ability of spring 94. Also, it will be understood by one skilled in the art that the interference fit between spring 94 and hub 91 must be sufficient to permit clutch subassembly 170 to resist counter-rotation of cam subassembly 160, in response to an induced tension in cable 30 such that, when lever assembly A is moved from the 'brake-released' to 'brake-applied' positions, clutch subassembly 170 locks cam subassembly 160 sufficiently so that cam subassembly 160 rotates with lever assembly A without slipping. Finally, it will be understood that the interference fit of spring 94 must also be loose enough so that, when free tang 98 is tabbed by finger 54 when actuator 10 is in the 'brake-released' position (as will be described below), pinion 90 is permitted to 'free-wheel' within spring 94, thereby unlocking cam subassembly 160 from lever assembly A.

Figure 3:
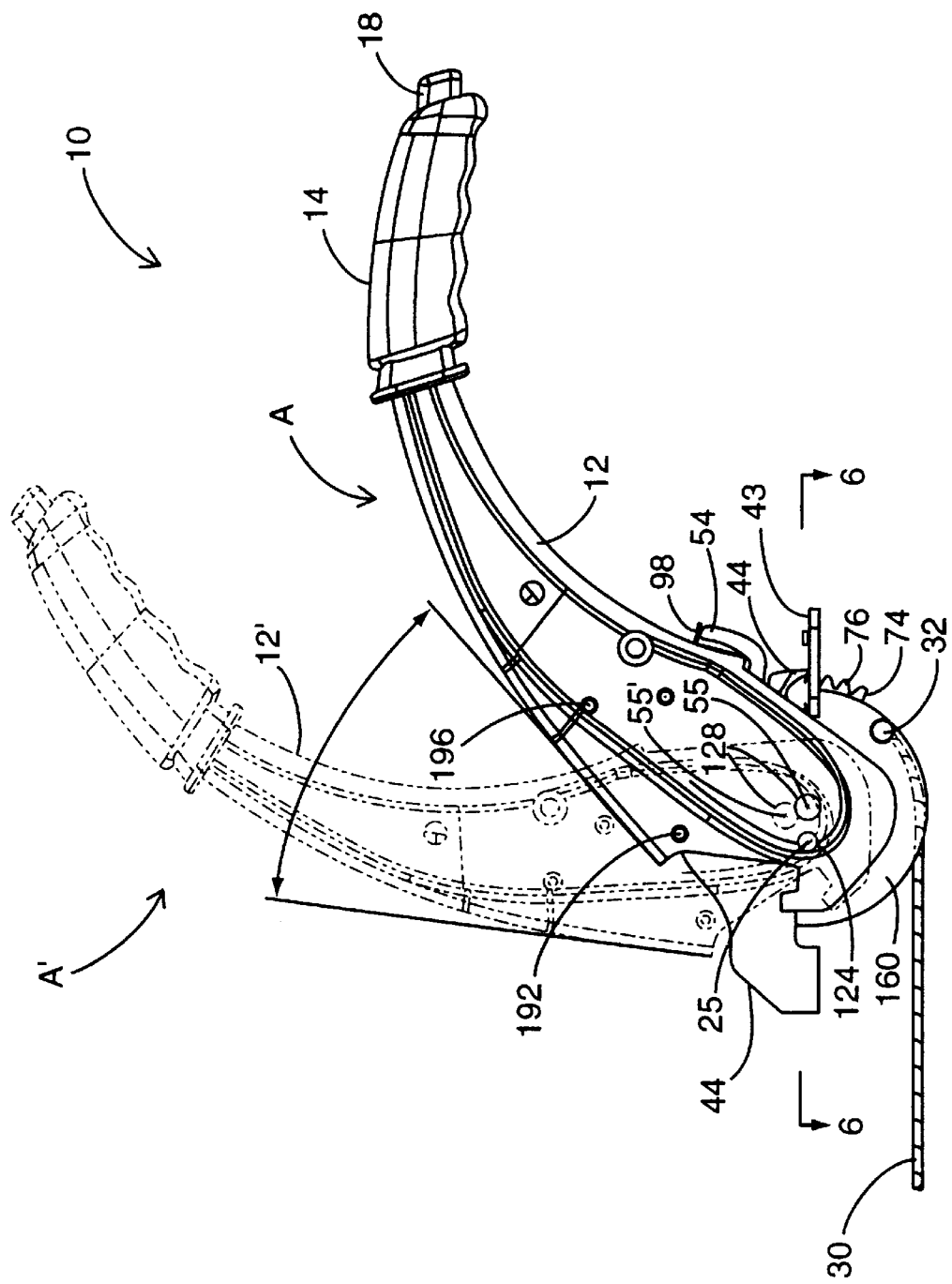
FIG. 3 is a side view of the actuator of FIG. 1, showing the other side thereof.

Referring to FIG. 3, in use actuator 10 is operated by selectively positioning lever assembly A in either the 'brake-released' position (shown in solid lines) or one of a plurality of 'brake-applied' positions (one such position shown in stippled lines at 12'). As indicated above, lever assembly A rotates about lever axis 25, by manipulation of lever 12 by the vehicle operator.

Referring to FIG. 7, when actuator 10 is in the 'brake-released' position, lever assembly A is positioned relative to mounting bracket 44 such that finger 54 engages free tang 98 of spring 94, thereby slightly unwinding spring 94 and allowing pinion 90 to rotate freely about pinion rivet 134, thus disengaging clutch subassembly 170. As a result, the self-adjusting cam subassembly 160, having sector teeth 76 engaged with pinion teeth 92, is "unlocked" relative to lever assembly A and capable of rotation in response to self-adjust spring 70. Any slack which may be present in cable 30, such as slack introduced unavoidably during installation or introduced over time by casual cable stretch, is thus automatically taken up by a rotation of cam subassembly 160 in the 'brake-apply' direction (clockwise in FIG. 7) when the actuator is in the 'brake-released' position. Spring 70 is sized and of sufficient strength to provide a desired minimum residual tension in cable 30 but not otherwise cause an unintentional application of the vehicle parking brakes.

Figure 4:
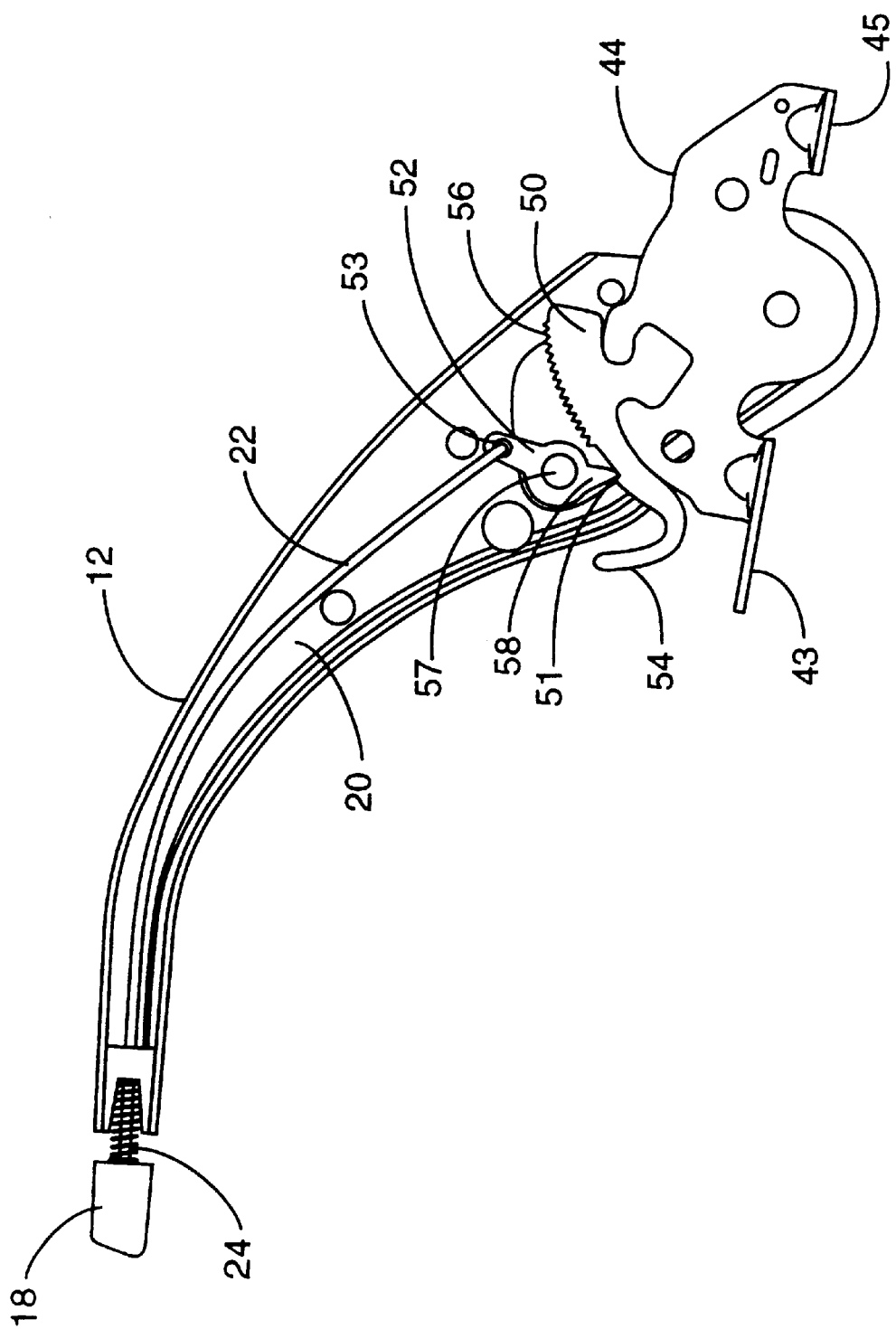
FIG. 4 is a cross-sectional schematic side view of the actuator of FIG. 1, showing the position lock assembly elements in isolation.
Figure 5:
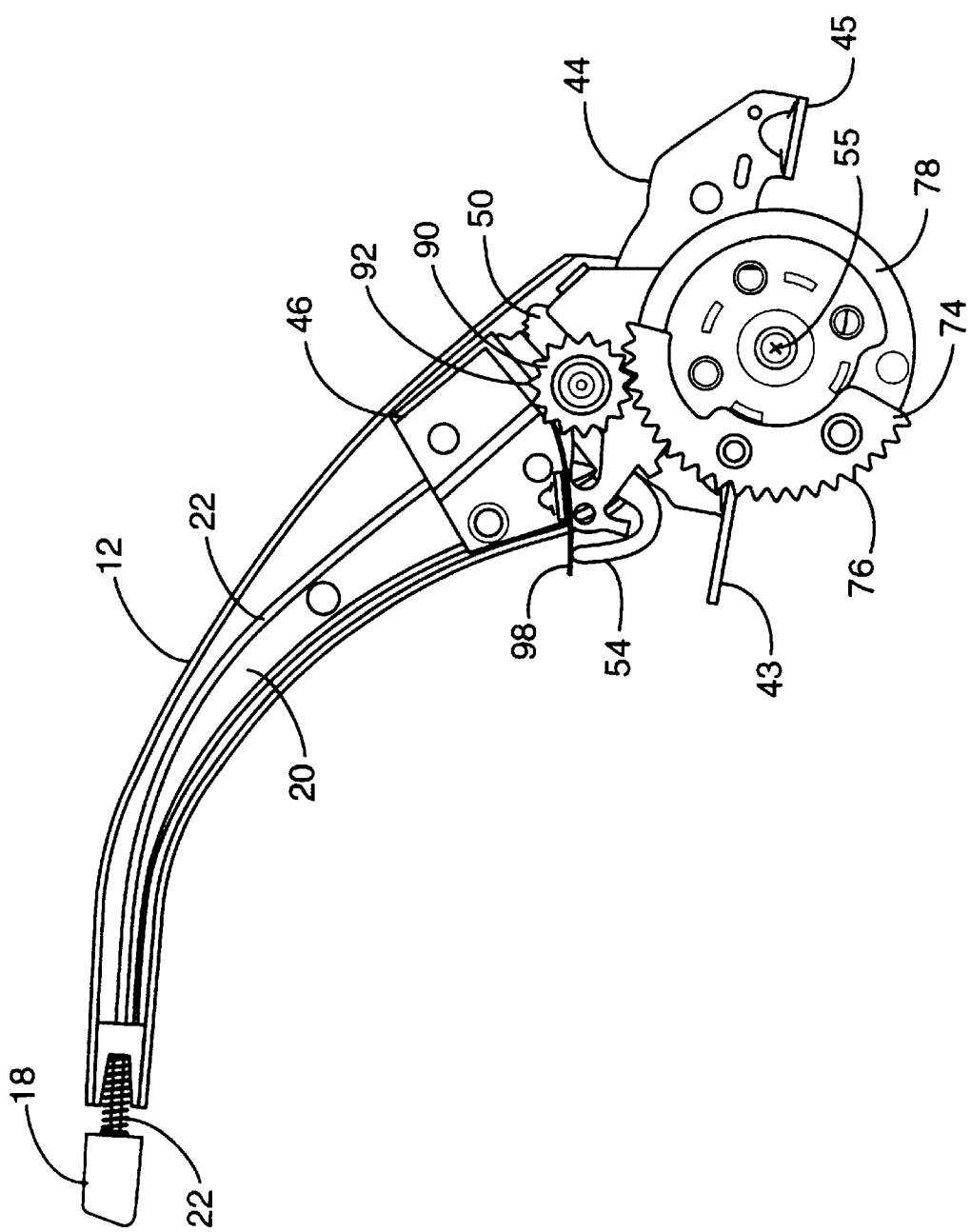
FIG. 5 is a second cross-sectional schematic side view of the actuator of FIG. 1, showing the self-adjust assembly elements in isolation.

Also, referring to FIG. 4, when actuator 10 is in the 'brake-released' position, position locking assembly B maintains nose 58 in contact with sector 50, adjacent un-toothed shoulder 51 and, thus, out of engagement with teeth 56.

Referring to FIG. 8, when lever assembly A is rotated out of the 'brake-released' position to a 'brake-applied' position, the rotation of lever assembly A moves clutch subassembly 170 away from finger 54, causing finger 54 to release tang 98 and permitting clutch spring 94 to contract and thereby tightly grasp pinion 90. As described above, since tang 96 of clutch spring 94 is anchored to cover plate 48 (i.e. part of lever assembly A), spring 94 cannot rotate and, thus, pinion 90 is thus not permitted to rotate, particularly in the clockwise direction (as viewed in FIGS. 7, 8). Cam subassembly 160 is thus "locked" to lever assembly A through the co-action of pinion teeth 92 and sector 74. The rotation of lever assembly A in 'brake-apply' direction tends to further wind the clutch spring 94 around hub 91, thereby increasingly prohibiting rotation of pinion 90. As a result of the 'locked' condition, pinion 90 is unable to rotate and an operative locked connection is established between the lever assembly A and the self-adjusting cam subassembly 160. As lever assembly A is rotated towards a 'brake-apply' position, cam subassembly 160 thus also rotates, around lever axis 25 due to the eccentric mounting of cam subassembly 160, and cable 30 is rotated clockwise (see FIG. 8) about lever pivot 25 to increasingly tension and take up cable to apply the parking brake system.

Also, as lever assembly A is advanced in the 'brake-apply' direction, pawl 52 is rotated about lever axis 25 to permit nose 58 to come into contact with teeth 56 of sector 50. The angle of teeth 56 of sector 50 relative to nose 58 of pawl 52 permits nose 58 to advance over teeth 56 without depressing button 18 of pawl release subassembly 155. Thus, the vehicle operator may simply rotate lever 12, although button 18 may be depressed if desired, once nose 58 has advanced from shoulder 51 to engage teeth 56, pawl subassembly 150 will act to prevent the reverse rotation of lever 12 in the 'brake-release' direction (i.e. clockwise in FIG. 4). Lever 12 is advanced in the 'brake-apply' direction, thereby tensioning cable 30, until a desired lever of brake cable tension is achieved to set the vehicle parking brakes sufficiently to the operator's satisfaction. The lever may have an operable rotation range of about 40°, for example. To release the brakes, button 18 is depressed to release nose 58 from teeth 56 for such rotation. When button 18 is depressed, pawl nose 58 rotates about the pawl pivot 57 to disengage nose 58 from sector teeth 56. Lever 12 may then be rotated, while button 18 is depressed, back to the 'brake-released' position.

Alternate means of engaging and disengaging clutch subassembly 170 are also available. For example, it will be understood that there will be a lag in the engagement of clutch subassembly 170 because, as lever assembly A moves spring tang 98 away from finger 54, there is a period during which clutch subassembly 170 is not fully engaged so as to lock cam subassembly 160 sufficiently to lever assembly A for synchronous movement of cam subassembly with lever assembly A. Rather some slippage occurs, resulting in lost lever travel occurring before operative engagement between clutch assembly 170 and cam subassembly 160 is achieved. Movement multiplying means, such as disclosed in U.S. Pat. No. 4,515,036 to Dotson (see lever 180 in Dotson), incorporated herein by reference, may be advantageously employed with the device according to the present invention to reduce such lost lever travel, thereby increasing the overall performance of actuator 10.

By providing an eccentric positioning of cam axes 55 relative to lever axis 25, the actuator according to the present invention achieves a variable mechanical advantage as the actuator lever is stroked to fill position. Thus, the amount of operator input force necessary to apply the parking brake throughout the lever stroke is reduced. Also, advantageously, the overall lever length can be reduced. Though the benefits of such eccentricity have been noted by the prior art, it has been discovered that even a small offset between the cam and lever axes provides surprising benefits in terms of the variable mechanical advantage achieved. For example, an eccentric offset "e" of 15 mm results in a significant increase in the maximum mechanical advantage achievable for an actuator given size. In other words, in comparing the performance of a concentrically mounted actuator versus the present invention, both devices having substantially identical overall outside dimensions and lever travels, a marked and significant performance advantage is provided by the present invention over the concentric design. Moreover, the comparable concentric actuators would require a substantially longer lever arm to balance mechanical advantage and cable take up for a given application, which may not be permitted if the surrounding environment limits lever motion.

Figure 9:
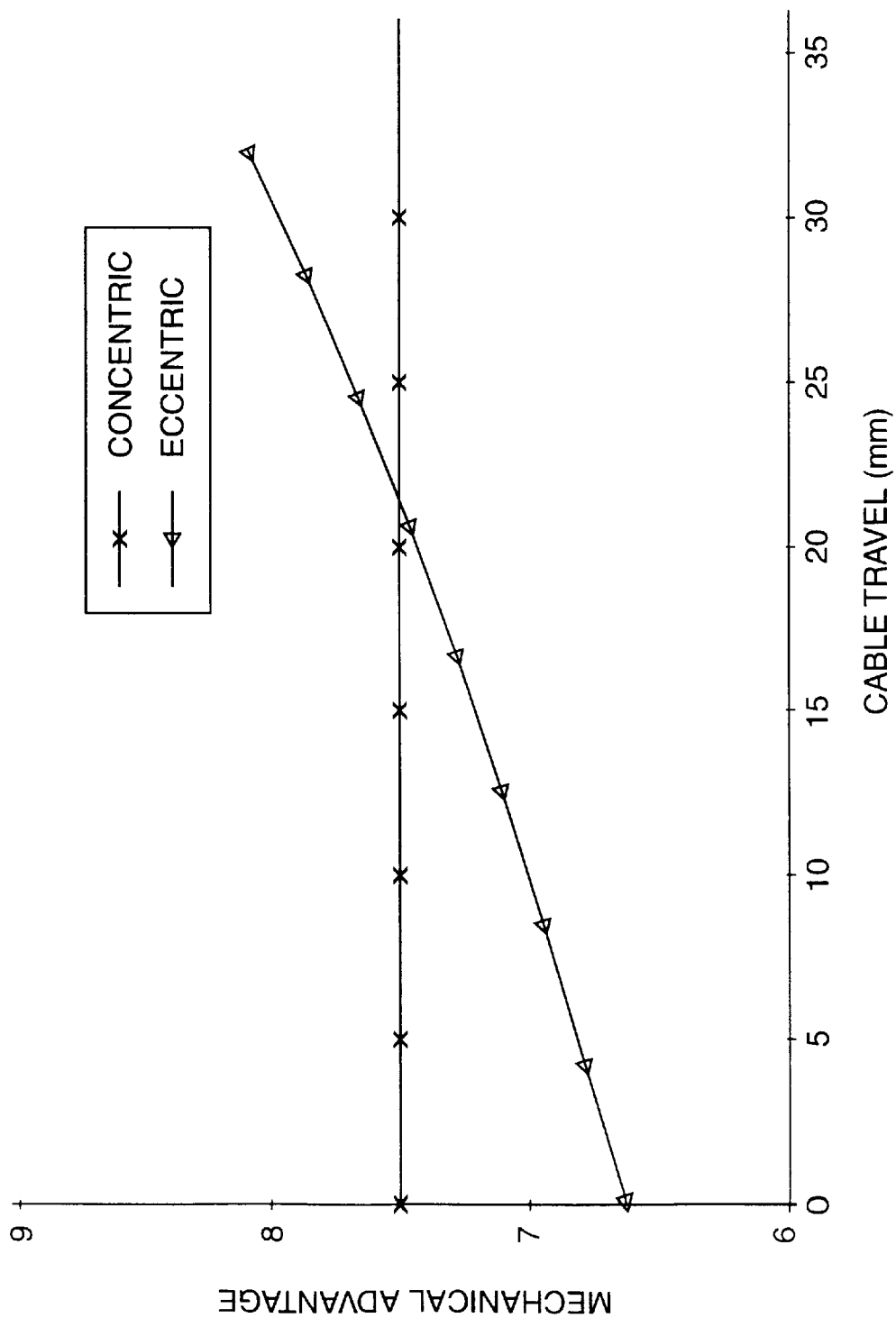
FIG. 9 is a chart plotting the mechanical advantage against cable travel.

The benefits of the present invention, in terms of available mechanical advantage per a given amount of cable travel, is shown in FIG. 9. The "Eccentric" line of FIG. 9 represents an actuator according to the present invention having a 350 mm lever, 45 mm radius cam and a 15 mm offset between the cam and lever axes. Also shown in FIG. 9, for comparison purposes, is a comparably-sized (in terms environmental space requirements) concentric actuator ("Concentric" v line). The "Eccentric" line clearly demonstrates that a small eccentric mounting yields a marked benefit, in terms of mechanical advantage, over a comparably-sized concentric design Further, the compact design permitted by the present invention permits its use in applications where environmental space limitations prevent the use of the bulky eccentric designs of the prior art. Thus, the present invention provides a good mechanical advantage performance while minimizing the space required for installation and operation of the actuator.

Though the intermediate plate permits the cam to be mounted closely to the lever pivot without the need for the design of special rivets or mounts for the cam and lever, it will be understood by one skilled in the art that other methods of mounting the cam are available. For example, a special double rivet could be designed for interposition between the lever and the cam to achieve the desired eccentricity in the mounting thereof. Further, it will be understood by one skilled in the art that the eccentricity of the cam and the lever can be varied for a given application, depending on the environmental space constraints and actuator performance required. Finally, it will be understood that if the cam axis is moved sufficiently away from the lever axis, the intermediate plate may also be omitted, as the cam member may be mounted between the cover plate and the lever, provided that a slot is located in the mounting bracket to permit the cam axis to pass therethrough and rotate eccentrically about the lever axis, in a maner as described above. Thus, other means of achieving the spacing and positioning functions of intermediate plate 46 are available.

Thus, the present invention provides means whereby an eccentrically mounted cam can be positioned close to the lever axis without fear of interference between the cam and the lever pivot. By positioning the cam laterally of the lever, the cam axis may be moved closer than "r", the radius of the cam, to the lever axis and thereby significantly reduce the overall size of the actuator device. It will be understood that the radius of the cam, as referred to herein, refers generally to the outermost radius of the cam subassembly.

The offset of cam axis 55 from lever axis 25 permits actuator 10 to initially have a low mechanical advantage in the early portion of the brake application cycle, thereby reducing the amount of lever rotation required achieve maximum cable take-up while cable tension is low, and have an increasing mechanical advantage as the brake application cycle progresses, to decrease the effort inquired by the vehicle operator to achieve a satisfactory brake cable tension (see FIG. 9). The mechanical advantage characteristics of a particular actuator 10 can be varied in design by altering design parameters such as position and offset of axes 25 and 55, the position of cable attachment point (i.e. slots 210 and 212) and the overall dimensions of the components of actuator 10.

Thus, the configuration of the actuator according to the present invention permits a compact design which advantageously reduces the overall space requirement for the actuator within the vehicle and yet provides a variable mechanical advantage and permits a reduction in the range of lever motion and overall lever loads required.

While the above description constitutes the preferred embodiments, it will be appreciated that the present invention is susceptible to modification and change without departing from the fair meaning of the proper scope of the accompanying claims.

For example, it will be understood that cam subassembly 160 need not comprise the multi-component subassembly described above, but rather may be of any construction suitable for achieving the functions described herein. In particular, the cam subassembly may comprise an integral element which need not be circular or of constant radius around its periphery. Further, it will be understood that drum 72 need not be a drum, per se, but rather drum 72 essentially performs spacing and spring-locating (ie. spring 70) functions which may equally be achieved by other suitable means.

Further, it will be understood that any suitable clutch means as is known in the art may be used for clutch subassembly 170, such as a pawl and sector clutch arrangement as disclosed in US. Pat. No. 4,841,798 to Porter et al., or a helical coil spring and drum arrangement as shown in U.S. Pat. No. 5,546,828 to Golarz, both incorporated herein by reference, or another clutching means as is known in the art to be adaptable to the present invention. Also, it will be understood that spring 94 need not engage the exterior of pinion 91, but rather spring 94 may be located interior of a hollow pinion and outwardly engage an interior surface of such pinion. Still further, any means of declutching spring 94 from pinion 91 may be used as a substitute for finger 54 without departing from the scope of His invention.

It will also be understood that the present invention need not be limited to the position lock arrangement of the present invention, but rather any position lock known in the art, such as those disclosed in U.S. Pat. No. 4,850,242 to Hass et al., or U.S. Pat. No. 3,236,120 to Fender, or yet other means, may be suitably employed. Other means for biasing pawl 52 towards engagement with ratchet 51 may also be used.

It will also be understood that the present invention is susceptible to yet further modification without departing from the scope of the attached claims.

I claim:

1. A lever mechanism for applying tension to a cable, said lever mechanism comprising:

(a) a bracket;
(b) a lever assembly, said lever assembly rotatably mounted to said bracket about a lever axis for rotation between a first position and a second position;
(c) a position lock adapted to releasably lock said lever assembly in said second position;
(d) a cam member adapted to connect to a cable, said cam member rotatably mounted on said lever assembly for rotation about a cam axis, said cam member having a radius about said cam axis, said cam axis offset from said lever axis by a distance less than said cam member radius;
(e) a spring adapted to rotatably bias said cam member in a direction tending to increase tension in a cable connected to said cam member, said spring extending between said cam member and said lever assembly; and
a clutch assembly mounted on said lever assembly said clutch assembly being actuatable to selectively prevent rotation of said cam member relative to said lever assembly, said clutch assembly adapted to actuate upon rotation of said lever assembly.

2. The lever mechanism of claim 1 wherein cam axis is parallel to said lever axis.

3. The lever mechanism of claim 1 wherein said lever assembly comprises a lever element and an intermediate element, said intermediate element mounted to said lever element, said cam member being mounted to said intermediate element.

4. The lever mechanism of claim 1 wherein said lever axis defines an axial direction and wherein said cam member is positioned adjacent said lever assembly in said axial direction.

5. The lever mechanism of claim 1 wherein said clutch assembly is adapted to actuate when said lever assembly is rotated out of said first position.

6. The lever mechanism of claim 1 wherein said clutch assembly is in constant rotating register with said cam member.

7. The lever mechanism of claim 6 wherein said clutch assembly comprises a pinion and said cam member further comprises a ratchet sector on a periphery thereof said pinion adapted to engage said ratchet sector.

8. The lever mechanism of claim 1 wherein said cam member is substantially circular.

9. The lever mechanism of claim 1 wherein said position lock comprises a pawl and ratchet assembly, said pawl and ratchet assembly mounted between said lever assembly and said bracket, said pawl and ratchet assembly comprising a pawl pivotably engagable with a sector gear.

10. A mechanism for variably tensioning a vehicle parking brake cable, said mechanism comprising:

(a) a bracket;
(b) a lever mounted to said bracket and rotatable about a lever axis between a brake-released position and a brake-applied position;
(c) a position lock adapted to releasably lock said lever in said brake-applied position;
(d) a cam member rotatably mounted to said lever about a cam axis, said cam being adapted for connection to a parking brake cable and having a cable guide adapted to receive said parking brake cable, said cam member being spring-biased to rotate towards said brake-applied direction, said cam axis being spaced apart a distance from said lever axis; and
(e) a clutch mounted on said mechanism, said clutch being adapted to fix said cam member relative to said lever when said lever is moved out of said brake-released position, wherein the distance in a normal direction from said lever axis to said cam axis is less than the radial distance from said cam axis to said cable guide.

11. The mechanism of claim 10 wherein cam axis is parallel to said lever axis.

12. The mechanism of claim 10 further comprising an intermediate member mounted to said lever, and wherein said cam member is mounted to said intermediate member.

13. The mechanism of claim 10 wherein said cam member has a cam radius and wherein said cam axis is offset from lever axis by a distance less than said cam radius.

14. The lever mechanism of claim 10 wherein said clutch assembly is in constant rotating register with said cam member.

15. The lever mechanism of claim 14 wherein said clutch assembly comprises a pinion and said cam member further includes a ratchet sector on a periphery thereof, said pinion engageable with said ratchet sector.

16. The lever mechanism of claim 10 wherein said cam member is substantially circular.

17. The lever mechanism of claim 10 wherein said position lock comprises a pawl and a ratchet assembly, said pawl and ratchet assembly mounted between said lever assembly and said bracket, said pawl and ratchet assembly comprising a pawl pivotably engagable with a sector gear.

18. A vehicle parking brake actuator for variably tensioning a brake cable comprising:

(a) a bracket;

(b) a lever rotatably mounted to said bracket, said lever rotatable about a lever axis, said lever rotatable between a brake-release position and a brake-apply position, said lever axis defining an axial direction;

(c) locking means for releasably maintaining said lever in said brake-apply position;

(d) self-adjusting cam means for connection to said brake cable, said selfadjusting cam means rotatably mounted to said lever about a cam axis, said cam axis being spaced apart from said lever axis in a direction normal to said lever axis a distance less than said cam radius;

(e) biasing means for rotatably biasing said self-adjusting means relative to said lever in a brake-apply direction; and (F) clutch means for selectively preventing rotation of said self-adjusting means relative to said lever.

19. The vehicle parking brake actuator of claim 18 wherein said positioning means is interposed between said lever and self-adjusting means.

20. The vehicle parking brake actuator of claim 18 wherein said clutch means are actuatable in response to rotation of said lever.

* * * * *